(12) United States Patent
Lee et al.

(10) Patent No.: US 7,110,365 B2
(45) Date of Patent: Sep. 19, 2006

(54) APPARATUS FOR ANALYZING PERFORMANCE OF TRAFFIC IN ASYNCHRONOUS TRANSFER MODE (ATM) SWITCH AND METHOD THEREOF, AND ATM SWITCHING SYSTEM EMPLOYING THE SAME

(75) Inventors: Tae-jin Lee, Suwon (KR); Woo-shik Kang, Suwon (KR); Ki-soo Chang, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 1037 days.

(21) Appl. No.: 09/994,887

(22) Filed: Nov. 28, 2001

(65) Prior Publication Data

US 2002/0131373 A1    Sep. 19, 2002

(30) Foreign Application Priority Data

Feb. 6, 2001    (KR) .................................. 2001-5724

(51) Int. Cl.
H04L 12/26 (2006.01)
H04L 12/28 (2006.01)

(52) U.S. Cl. ................ 370/252; 370/395.2; 370/236.1; 370/232

(58) Field of Classification Search .............. None
See application file for complete search history.

(56) References Cited

U.S. PATENT DOCUMENTS 6,144,639 A * 11/2000 Zhao et al. ............... 370/235
6,445,707 B1 * 9/2002 Iuoras et al. .............. 370/232
6,549,517 B1 * 4/2003 Aweya et al. ........... 370/236.1
6,584,111 B1 * 6/2003 Aweya et al. .............. 370/232
6,788,646 B1 * 9/2004 Fodor et al. ............... 370/235

FOREIGN PATENT DOCUMENTS

| JP | 2000-124916 A | 4/2000 |
| JP | 2000-307610 A | 11/2000 |
| JP | 2000-354042 A | 12/2000 |

* cited by examiner

Primary Examiner—Steven Nguyen
(74) Attorney, Agent, or Firm—Sughrue Mion, PLLC

(57) ABSTRACT

An apparatus and method for analyzing the performance of an ATM switch, and an ATM switching system employing the same. The apparatus includes a traffic detecting portion for detecting traffic of constant bit rate connection type data and available bit rate connection type data input to the ATM switch installed in a communication network for processing a data circuit switching, and a performance analyzing portion for calculating a performance of processing the constant bit rate connection type data and the available bit rate connection type data according to information related to the detected traffic of the constant bit rate connection type data and the available bit rate connection type data. According to the apparatus and method, and an ATM switching system employing the same, performance of the ATM switch can be analyzed and the analyzed result can be used in designing the ATM switch.

11 Claims, 7 Drawing Sheets

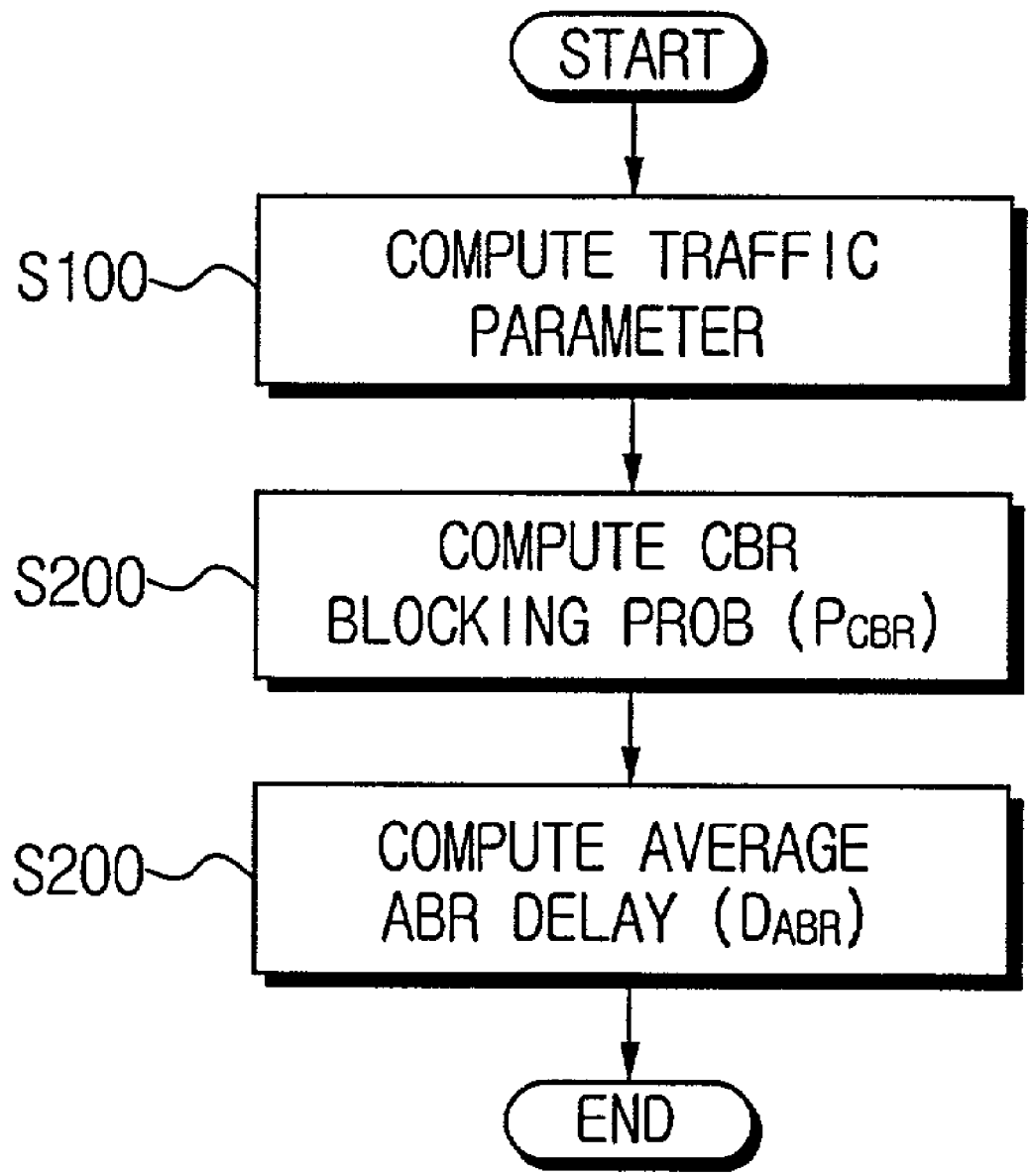

APPARATUS FOR ANALYZING PERFORMANCE OF TRAFFIC IN ASYNCHRONOUS TRANSFER MODE (ATM) SWITCH AND METHOD THEREOF, AND ATM SWITCHING SYSTEM EMPLOYING THE SAME

BACKGROUND OF THE INVENTION

1. Field of the Invention

The present invention relates to an apparatus for analyzing performance of an ATM switch, a method thereof, and an ATM switching system employing the same, and, more particularly, to an apparatus for analyzing the performance of an ATM switch with respect to a data transmission capacity for transmitting data input to the ATM switch, a method thereof, and an ATM switching system employing the same. The present application is based on Korean Patent Application No. 2001-5724 filed Feb. 6, 2001, which is incorporated herein by reference.

2. Description of the Related Art

Generally, there are synchronous communications and asynchronous communications in the communication method.

An asynchronous transfer mode (ATM) is one of the asynchronous communications that has higher data transmission efficiency when compared with time division multiplexing (TDM) of the synchronous communication methods. In the TDM method, a predetermined slot is assigned to each subscriber terminal, and thus data is transmitted only in the assigned slot. Accordingly, in the TDM method, data transmission efficiency is deteriorated, since there is a period of time when the subscriber terminal does not transmit data in the assigned slot, leaving the slot unused for the data transmission.

Compared to the TDM method, the ATM method has a higher data transmission efficiency since the ATM method makes a connection to transmit the data as necessary.

In such an ATM method, the data transmission path is determined in advance of making connection by using the connection-oriented method.

In the ATM network built by the ATM method, a cell of 53 bytes, which is a data transmission unit, is switched.

As exemplarily shown in FIG. 1, the ATM network has ATM switches for switching the cells, and also has terminals.

The ATM switches 30 are connected through a communication network, and switch the cells to the transmission path. The terminals may include computers 10, routers 20, and LAN switches (not shown), etc.

The communication services provided by the ATM network are constant bit rate (CBR) service, and an available bit rate (ABR) service. The CBR service is assigned for the connection at a constant transmission rate, while the ABR service uses a remainder transmission rate that is left after the transmission rate is assigned for connection in the CBR service.

In the ATM network, the data for the respective connections is contained in the cells (packets) and transferred through the ATM switches 30 located at the desired destination. As shown in FIG. 2, the CBR an ABR connection cells 32 are stored in buffers 31 via input ports of the ATM switches 30, and switched to output ports selected to be transferred to desired destinations. The number of CBR and ABR connections is varied dynamically according to the time.

FIG. 3 illustrates the number of connections of respective types input to the ATM switches 30 being varied according to the time. The area bounded by a dotted line, which is not hatched, represents an area where a number of CBR connections NCBR(t) are located according to the time (t). For a better understanding, specific values are given in the drawing to represent the number of CBR connections. The hatched area, which is not occupied by the NCBR(t), represents the area where a number of ABR connections NABR(t) can be located according to the time (t). A reference character 'r' represents a minimum number of connections for ensuring the ABR connections with respect to the processing capacity of the ATM switches 30, i.e., available transmission rates. 'C' represents a maximum number of connections for ensuring the CBR connections.

With a given processing capacity (transmission rate) of the ATM switches, since there is no way to obtain connection denial possibilities of CBR connections, or an average time for data transmission of the ABR connection, there is a difficulty in designing an optimum switch when building a network.

SUMMARY OF THE INVENTION

The present invention has been made to overcome the above-mentioned problems of the related art, and accordingly, it is an object of the present invention to provide an apparatus for analyzing a performance of an ATM switch when a number and types of connections are dynamically changed, and utilizing the analyzed information for network build-up and management, and an ATM switching system employing the same.

The above object is accomplished by an apparatus for analyzing performance of an ATM switch in accordance with the present invention, including a traffic detecting portion for detecting traffic of constant bit rate connection type data and available bit rate connection type data input to the ATM switch installed in a communication network for processing a data circuit switching, and a performance analyzing portion for calculating a processing performance with respect to the constant bit rate connection type data and the available bit rate connection type data, according to information related to the detected traffic of the constant bit rate connection type data and the available bit rate connection type data.

The information related to traffic includes arrival rates per second of the constant bit rate connection type data and the available bit rate connection type data.

Preferably, the performance analyzing portion calculates a connection denial rate of the constant bit rate connection type data and an average delay time of the available bit rate connection type data from a value output from the traffic detecting portion, a selected average occupancy time of constant bit rate connection type data in the ATM switch, and an average data size of the available bit rate connection type data to be transmitted.

Further, the above object is accomplished by an ATM switching system in accordance with the present invention, including an ATM switch installed in a communication network, for processing a circuit exchange between constant bit rate connection type data and available bit rate connection type data input through an input portion, a traffic detecting portion for detecting traffic of the constant bit rate connection type data and the available bit rate connection type data input to the ATM switch, a performance analyzing portion for calculating a processing performance with respect to the constant bit rate connection type data and the available bit rate connection type data according to information related to the detected traffic of the constant bit rate connection type data and the available bit rate connection type data, and a traffic control portion for controlling data processing of the ATM switch according to values analyzed by the performance analyzing portion.

Further, the ATM switching system includes a data storing portion for storing values analyzed by the performance analyzing portion, an inputting portion for inputting processing performance values desired for the constant bit rate connection type data and the available bit rate connection type data, and a performance determining portion for calculating a processing capacity of the ATM switch that satisfies parameters input from the inputting portion, by using the data stored in the data storing portion.

The above object is accomplished by a method for analyzing the performance of an ATM switch installed in a communication network for processing data circuit exchange in accordance with the present invention, the method including the steps of (a) detecting traffic of constant bit rate connection type data and available bit rate connection type data input to the ATM switch, and (b) calculating a processing performance of the ATM switch with respect to the constant bit rate connection type data and the available bit rate connection type data according to information related to the detected traffic of the constant bit rate connection type data and the available bit rate connection type data.

The step (b) calculates a connection denial rate of the constant bit rate connection typed data and an average delay time of the available bit rate connection type data from a value output from the traffic detecting portion, a selected average occupancy time of constant bit rate connection type data in the ATM switch, and an average data size of the available bit rate connection type data to be transmitted.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 5 is a flowchart for explaining a performance analyzing process of the ATM switch in accordance with the present invention;

DETAILED DESCRIPTION OF PREFERRED EMBODIMENTS

An apparatus for analyzing the performance of an ATM switch in accordance with the preferred embodiments of the present invention, and an ATM switching system employing the same will be described below in greater detail with reference to the accompanying drawings.

Figure 4:
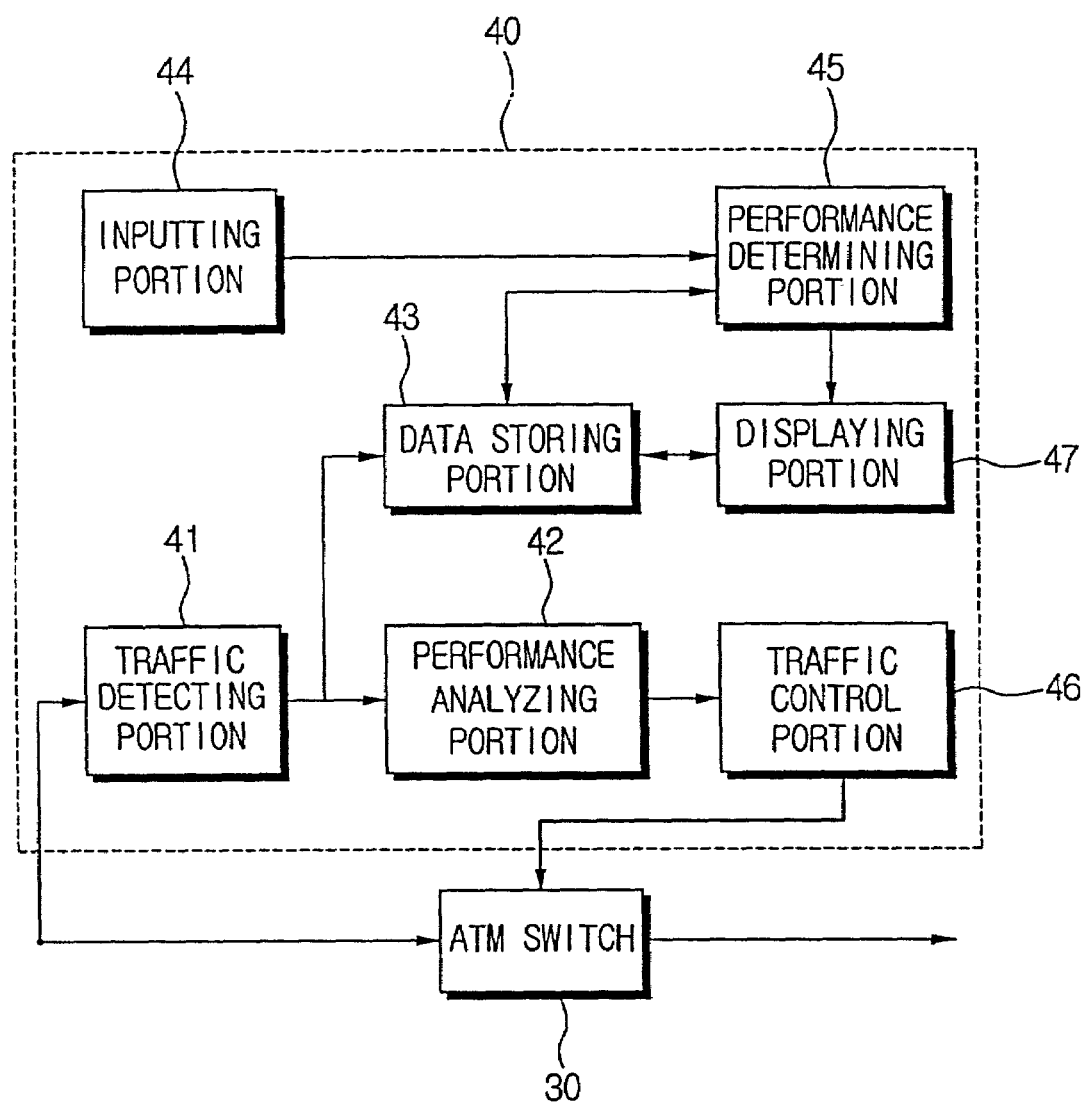
FIG. 4 is a view showing an ATM switching system in accordance with a preferred embodiment of the present invention.

FIG. 4 is a block diagram showing an ATM switching system in accordance with a preferred embodiment of the present invention.

Referring to FIG. 4, the ATM switching system includes a performance analyzer 40, and an ATM switch 30.

The ATM switch 30 stores an input cell in a buffer, and outputs the cell to a destination through a selected output portion.

The ATM switch 30 includes an input portion, a buffer, a switching portion, and an output portion. The switching portion outputs the cell from the buffer by various known methods. In such an ATM switch 30, the buffer may be provided between the switching portion and the output end. The switching portion can use various known methods for cell switching, and the detailed description thereof will be omitted.

A traffic detecting portion 41 detects traffic state information with respect to CBR connection type data and ABR connection type data input to the ATM switch 30.

Here, the traffic state information includes arrival rates per second ($v$) and ($\lambda$) of the CBR and ABR connections, respectively.

The traffic detecting portion 41 may also detect an average occupancy time ($\mu^{-1}$) for CBR connection, and an average transmission data rate (1/m) for ABR connection. Alternatively, information about the average occupancy time ($\mu^{-1}$) for CBR connection, and the average transmission data rate (1/m) for ABR connection can be preset in the performance analyzing portion 42.

The performance analyzing portion 42 analyzes the performance of the CBR and ABR services by using parameters detected from the traffic detecting portion 41. Here, the performance analyzing information includes a connection denial rate for CBR connection, and an average delay time for ABR connection.

Figure 6A:
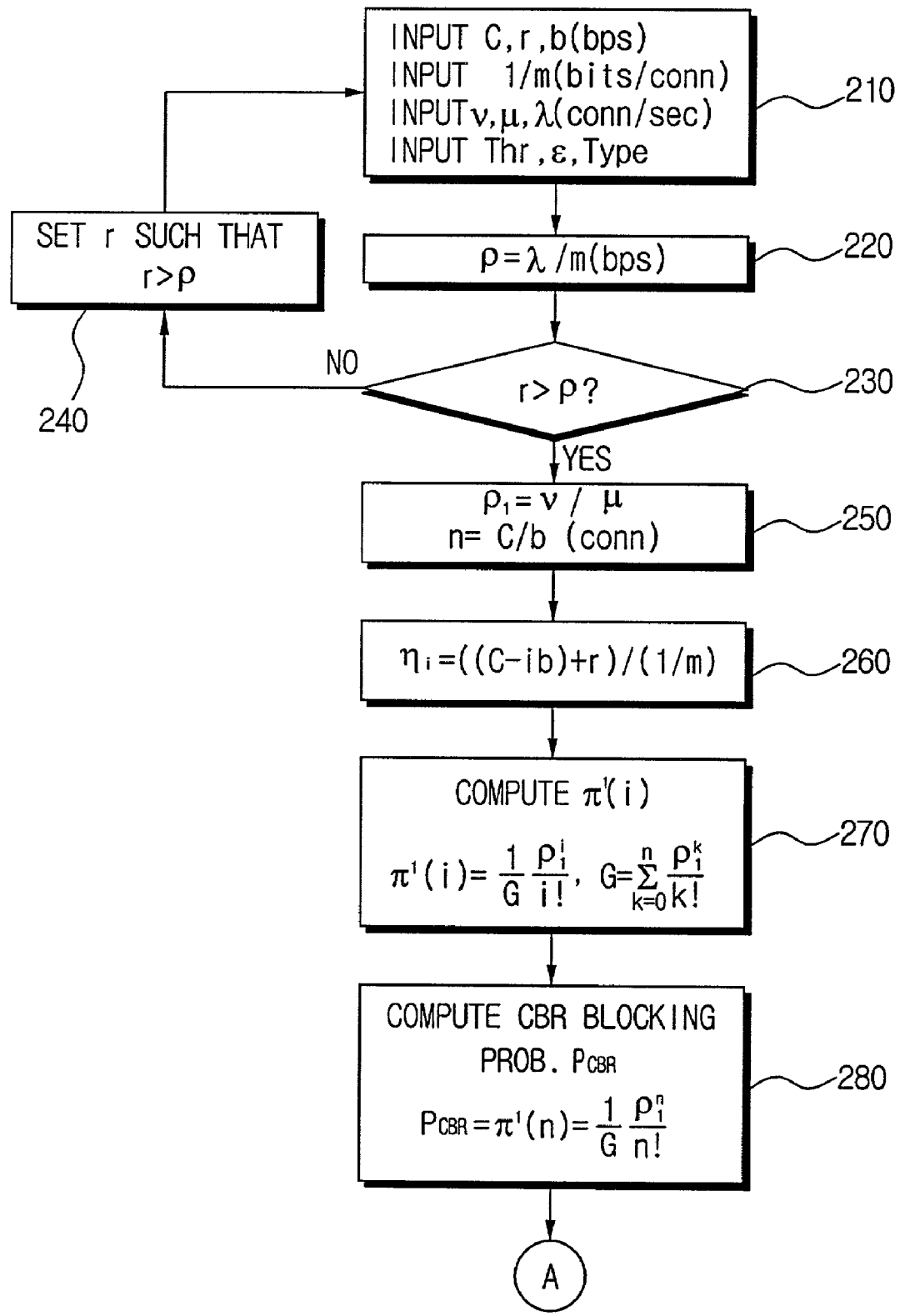
FIGS. 6A and 6B are flowcharts for showing the performance analyzing process of FIG. 5 in greater detail.
Figure 6B:
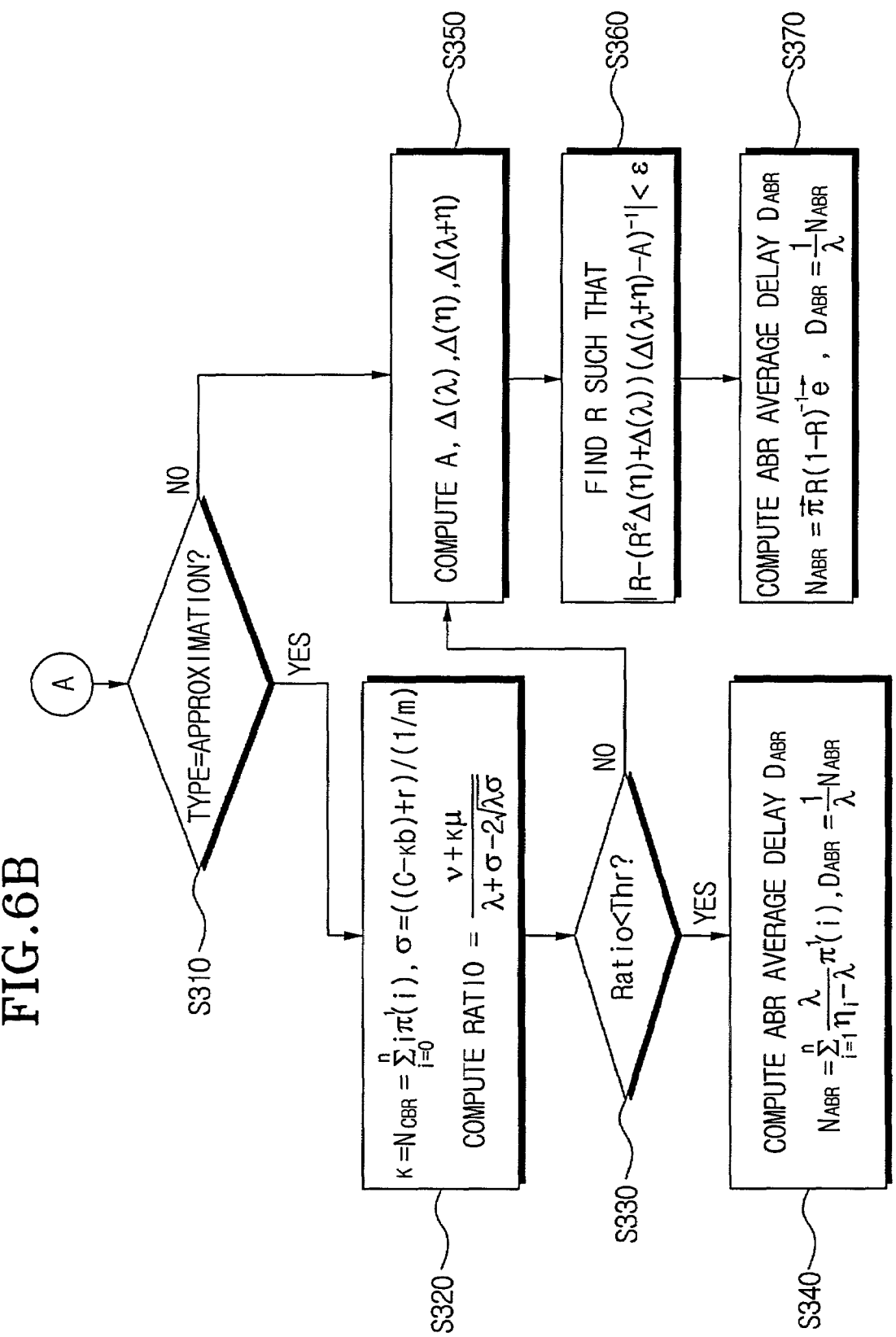

The performance analyzing process by the traffic detecting portion 41 and the performance analyzing portion 42 will be described below with reference to FIGS. 5, 6A, and 6B.

First, a traffic parameter is calculated (step S100). That is, the arrival rates per second ($v$ and $\lambda$) of CBR and ABR connections are calculated. Alternatively, the arrival rates per second ($v$ and $\lambda$), the average occupancy time ($\mu^{-1}$) for CBR connection, and the average transmission data rate (1/m) for ABR connection may be calculated.

Next, a CBR blocking probability ($P_{CBR}$) is calculated from such calculated traffic parameter (step S200).

Then an average ABR delay time ($D_{ABR}$) is calculated (step S300).

The performance analyzing process will be described in greater detail below with reference to FIGS. 6A and 6B.

First, the calculated parameters are input with additional parameters (step S210). That is, parameters 'C', 'r', 'b', '1/m', '$v$', '$\mu$', '$\lambda$' are input.

Here, the character 'C' represents a processing capacity of the ATM switch 30, 'b' is data size per CBR connection, 'r' is a value applied for ensuring minimum transmission rate for the ABR connection, 1/m is the average data size to be transferred per ABR connection, and λ is the arrival rate per second of the ABR connection.

An additional parameter 'Thr' is a value (e.g., 0.05) for comparison with the ratio, which will be described later. If the ratio is smaller than the parameter 'Thr', a substantially exact result can be obtained even by an approximation calculation method.

'ε' is a very small value (e.g. 0.0000001) used as a reference for determining a variable that is used to calculate the average ABR delay time. This will be described later.

'Type' is a user input value for determining whether the calculation should be operated by approximation or accurate calculation.

The abbreviations in parentheses represents units, respectively. Accordingly, the abbreviation 'bps' represents bits per second, 'bits/conn' is a bits per connection, and 'conn/sec' is a number of connections per second.

Next, among the values input with respect to the respective parameters, the arrival rate per second of ABR connection (λ) is multiplied with the average transmission data rate for ABR connection (1/m) (step S220).

Then it is determined whether the product (ρ) of the multiplication of S220 is smaller than the value (r), which is applied for ensuring minimum transmission data rate for the ABR connection (step S230).

When the value (r) is determined to be smaller than the value (ρ) in S230, the value (r) is adjusted to be greater than the value (ρ) (step S240).

When the value (r) is determined to be greater than the value (ρ) in S230, a CBR blocking probability is obtained by using the respective parameters (steps S250 through S280). Here, the fact that the value (r) is greater than the value (ρ) means that the average transmission data required by one ABR connection per second should be greater than the value (ρ).

A variable 'i' attached in front of the parameter 'b' in S260, stands for the number of CBR connections.

Being written in general expressions by known arithmetic symbol, descriptions about the calculations of S250 through S280 will be omitted.

Next, the process of calculating the ABR average delay time ($D_{ABR}$) will be described.

First, the 'Type' determines whether the ABR average delay time ($D_{ABR}$) will be calculated by an approximation or an accurate calculation (step S310).

When the 'Type' is determined to be an approximation, the ratio is calculated through the expressions shown in the drawings, and then it is determined whether the ratio is smaller than the predetermined 'Thr' (step S330).

When the ratio is determined to be smaller than 'Thr', the ABR average delay time ($D_{ABR}$) is calculated by the expressions shown (step S340).

When the ratio is determined to be above the 'Thr' in S330, functions in S350, i.e., A, $\Delta(\lambda)$, $\Delta(\eta)$, $\Delta(\lambda+\eta)$, are obtained.

Here, the functions A, $\Delta(\lambda)$, $\Delta(\eta)$, $\Delta(\lambda+\eta)$ are obtained by following matrix expressions 1 through 6.

$$A = \begin{bmatrix} -v & v & 0 & 0 & 0 \\ \mu & -(\mu+v) & v & 0 & 0 \\ 0 & 2\mu & -(2\mu+v) & v & 0 \\ 0 & 0 & 0 & 0 & 0 \\ \vdots & \vdots & \vdots & \vdots & \vdots \\ 0 & 0 & n\mu & -(n\mu+v) & v \end{bmatrix}$$ [Expression 1]

$$\Delta(\lambda) = \text{diag}[\lambda \lambda \ldots \lambda]$$ [Expression 2]

$$\Delta(\eta) = \text{diag}[\eta_0 \eta_1 \ldots \eta_n]$$ [Expression 3]

$$\Delta(\lambda+\eta) = \text{diag}[\lambda+\eta_0 \; \lambda+\eta_1 \ldots \lambda+\eta_n]$$ [Expression 4]

$$\vec{\pi} = [\pi^1(0) \pi^1(1) \pi^1(2) \ldots \pi^1(n)]$$ [Expression 5]

$$\vec{e} = [1\; 1\; 1 \ldots 1]$$ [Expression 6]

Accordingly, the average ABR delay time $D_{ABR}$ is obtained through the expression of S370 by using the above expressions 1 through 6 and 'R' obtained through the expression of S360. Among the abbreviations of the expressions, the 'diag' stands for a diagonal matrix.

It is preferable to store the connection denial rate for CBR connection and the average delay time for ABR connection obtained as indicated above in the data storing portion 43 for later use.

An input portion 44 has a plurality of manipulation keys through which a program builder or a manager inputs his/her desired CBR and ABR performances, i.e., the denial rate for CBR connection and average delay time for ABR connection.

A performance determining portion 45 determines a desired capacity for the ATM switches 30 that would satisfy the desired CBR and ABR performances (i.e., denial rate for CBR connection and average delay time for ABR connection) which are input through the input portion 44.

Figure 7:
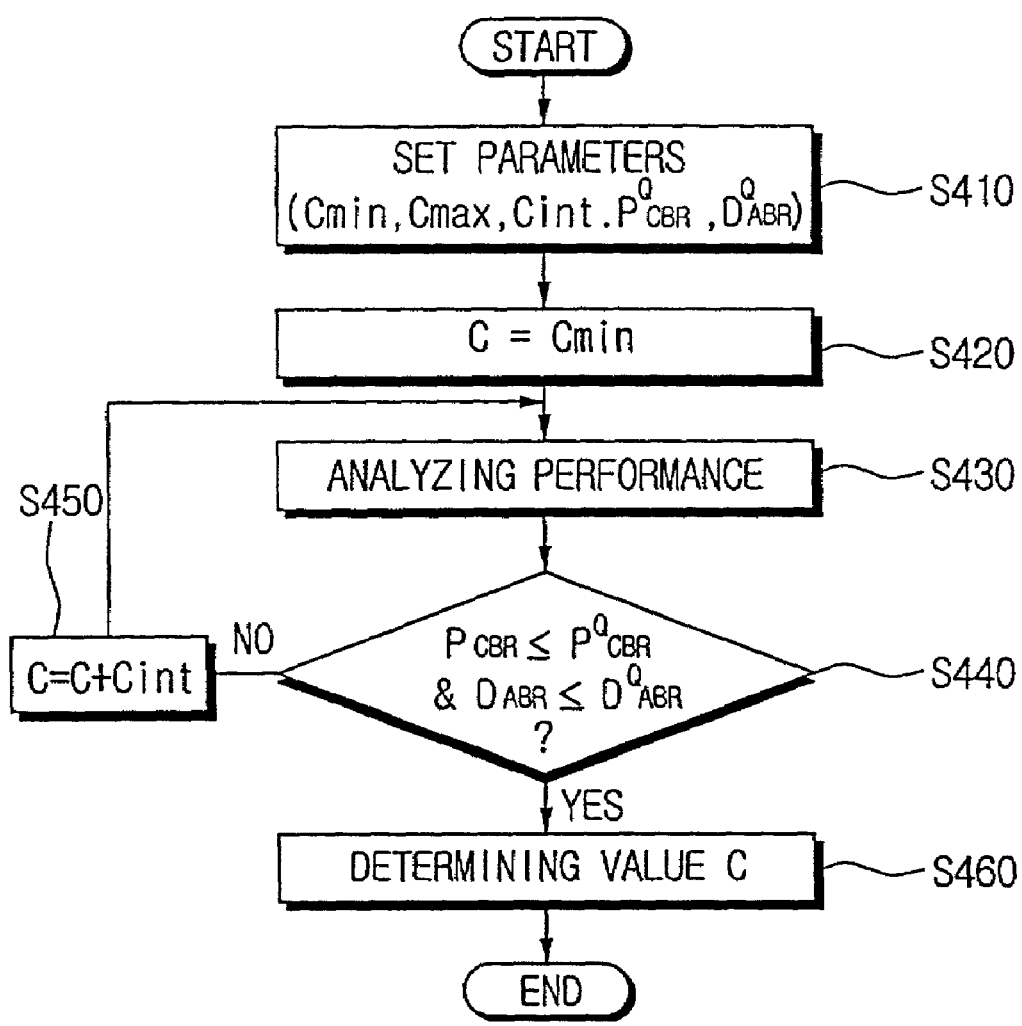
FIG. 7 is a flowchart for showing a process of determining a necessary capacity of the ATM switch suitable for the data processing capacity required by a user.

The process of determining the required capacity for the ATM switches 30 will now be described with reference to FIG. 7.

First, the requirements for CBR and ABR performances input through the input portion 44, i.e., the denial rate for CBR connection ($P^Q_{ABR}$) and the average delay time for ABR connection ($D^Q_{ABR}$), and also the minimum available performance range (Cmin), maximum available performance range (Cmax) and an increment for performance analysis (Cint) are set (step S410).

Next, Cmin is set as the processing capacity value 'C' (step S420), and performance analysis is performed (step S430).

The $P_{CBR}$, $D_{ABR}$, obtained through the performance analysis, are compared with corresponding values, $P^Q_{CBR}$ and $D^Q_{ABR}$, respectively (step S440).

When the $P^Q_{CBR}$ and $D^Q_{ABR}$ are smaller than the corresponding values $P_{CBR}$ and $D_{ABR}$, the increment value (Cint) is added to the processing capacity value 'C' for a performance analysis (step S450).

The performance analysis is then performed on the value obtained by S450.

When the values $P^Q_{CBR}$ and $D^Q_{ABR}$ are equal to, or greater than the corresponding values $P_{CBR}$ and $D_{ABR}$ as a result of the repetitious performance of the above steps, the processing capacity value 'C' applied in S430 is determined as the user's desired ATM switch capacity (step S460).

It is preferable to store such obtained processing capacity value 'C' in the data storing portion 43 for controlling the design and operation of the ATM switches.

A display portion 47 receives from corresponding elements and displays a performance analysis result that is output from the performance analyzing portion 42, or the performance judgment value output from the performance determining portion 45.

A traffic controlling portion 46 adjusts the arrival rates per second (v) and (λ) of CBR and ABR connections, which are required to satisfy the requirements for the denial rate for CBR connection and the average delay time for ABR connection. That is, the CBR and ABR traffics are controlled by such adjusted arrival rates per second (ν) and (λ).

Figure 1:
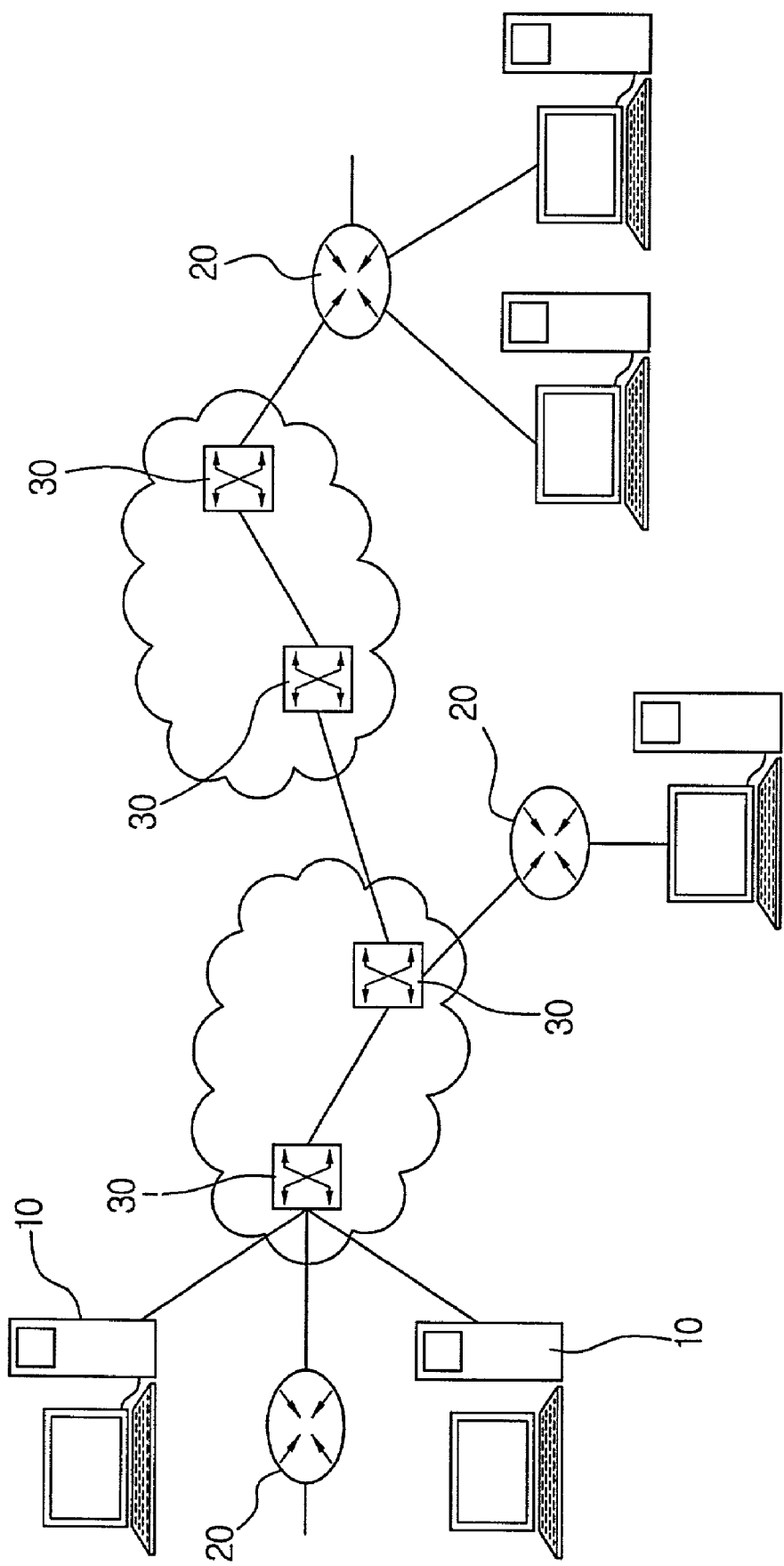
FIG. 1 is a view showing a conventional ATM network.
Figure 2:
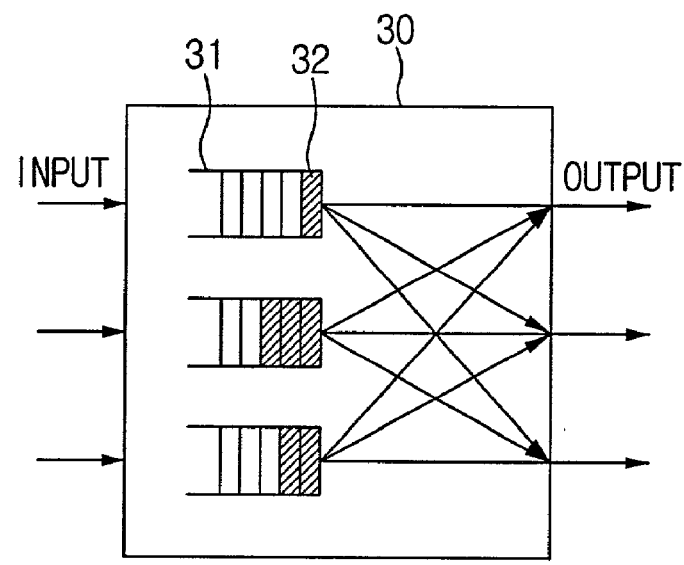
FIG. 2 is a view showing a process in which data is processed in the ATM switch of FIG. 1.
Figure 3:
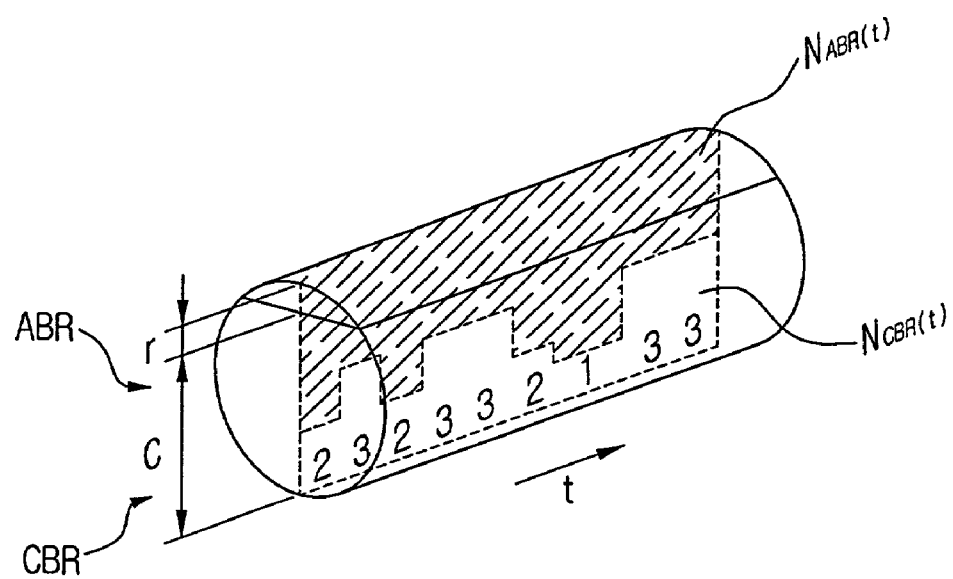
FIG. 3 is a view illustrating the number of connections input to the ATM switch of FIG. 1 being changed dynamically with respect to the connection type according to the time.

Here, the processing capacity value (c) is the capacity value to be allotted to the CBR connection from all of the capacity that is available for data processing by the ATM switches 30 (see FIG. 3).

The system of the present invention may well be applied in the Digital Subscriber Line Access Multiplexer (DSLAM).

As described above, the apparatus for analyzing performance of the ATM switches, and the ATM switching system employing the same in accordance with the present invention, is capable of analyzing the performance of the ATM switches and also can be used in designing the switches. That is, the builder can properly select the switches with the capacity suitable for the data processing capacity of the ATM network that he/she wishes to build, and also can predict a number of ABR and CBR connections to be available for performance maintenance of such built ATM network.

Although the preferred embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. An apparatus for analyzing performance of an asynchronous transfer mode (ATM) switch, comprising:
    a traffic detecting portion for detecting traffic of constant bit rate connection type data and available bit rate connection type data input to the ATM switch installed in a communication network for processing a data circuit switching;
    a performance analyzing portion for calculating a processing performance with respect to the constant bit rate connection type data and the available bit rate connection type data according to information related to the detected traffic of the constant bit rate connection type data and the available bit rate connection type data; and
    a performance determining portion that calculates a processing capacity of the ATM switch based on the processing performance, wherein the processing capacity includes a processing capacity value C that is to be allotted to a constant bit rate connection.

2. The apparatus of claim 1, wherein the traffic detecting portion calculates and outputs to the performance analyzing portion arrival rates per second of the constant bit rate connection type data and the available bit rate connection type data.

3. An apparatus for analyzing performance of an asynchronous transfer mode (ATM) switch, comprising:
    a traffic detecting portion for detecting traffic of constant bit rate connection type data and available bit rate connection type data input to the ATM switch installed in a communication network for processing a data circuit switching; and
    a performance analyzing portion for calculating a processing performance with respect to the constant bit rate connection type data and the available bit rate connection type data according to information related to the detected traffic of the constant bit rate connection type data and the available bit rate connection type data;

wherein the traffic detecting portion calculates and outputs to the performance analyzing portion arrival rates per second of the constant bit rate connection type data and the available bit rate connection type data; and
    wherein the performance analyzing portion calculates a connection denial rate of the constant bit rate connection type data and an average delay time of the available bit rate connection type data from a value output from the traffic detecting portion, a selected average occupancy time of the constant bit rate connection type data in the ATM switch, and an average data size of the available bit rate connection type data to be transmitted.

4. The apparatus of claim 3, further comprising:
    a data storing portion for storing values analyzed by the performance analyzing portion;
    an inputting portion for inputting processing performance values desired for the constant bit rate connection type data and the available bit rate connection type data; and
    a performance determining portion for calculating a processing capacity of the ATM switch that satisfies parameters input from the inputting portion, by using the data stored in the data storing portion.

5. An asynchronous transfer mode (ATM) switching system, comprising:
    an ATM switch installed in a communication network, for processing a circuit exchange between constant bit rate connection type data and available bit rate connection type data input through an inputting portion;
    a traffic detecting portion for detecting traffic of the constant bit rate connection type data and the available bit rate connection type data input to the ATM switch;
    a performance analyzing portion for calculating a processing performance with respect to the constant bit rate connection type data and the available bit rate connection type data according to information related to the detected traffic of the constant bit rate connection type data and the available bit rate connection type data;
    a traffic control portion for controlling data processing of the ATM switch according to values analyzed by the performance analyzing portion; and
    a performance determining portion that calculates a processing capacity of the ATM switch based on the processing performance, wherein the processing capacity includes a processing capacity value C that is to be allotted to a constant bit rate connection.

6. The ATM switching system of claim 5, wherein the traffic detecting portion calculates and outputs to the performance analyzing portion arrival rates per second of the constant bit rate connection type data and the available bit rate connection type data.

7. An asynchronous transfer mode (ATM) switching system, comprising:
    an ATM switch installed in a communication network, for processing a circuit exchange between constant bit rate connection type data and available bit rate connection type data input through an inputting portion;
    a traffic detecting portion for detecting traffic of the constant bit rate connection type data and the available bit rate connection type data input to the ATM switch;
    a performance analyzing portion for calculating a processing performance with respect to the constant bit rate connection type data and the available bit rate connection type data according to information related to the detected traffic of the constant bit rate connection type data and the available bit rate connection type data; and a traffic control portion for controlling data processing of the ATM switch according to values analyzed by the performance analyzing portion;

wherein the traffic detecting portion calculates and outputs to the performance analyzing portion arrival rates per second of the constant bit rate connection type data and the available bit rate connection type data; and wherein the performance analyzing portion calculates a connection denial rate of the constant bit rate connection type data and an average delay time of the available bit rate connection type data from a value output from the traffic detecting portion, a selected average occupancy time of the constant bit rate connection type data in the ATM switch, and an average data size of the available bit rate connection type data to be transmitted.

8. An asynchronous transfer mode (ATM) switching system, comprising:

an ATM switch installed in a communication network, for processing a circuit exchange between constant bit rate connection type data and available bit rate connection type data input through an inputting portion;

a traffic detecting portion for detecting traffic of the constant bit rate connection type data and the available bit rate connection type data input to the ATM switch;

a performance analyzing portion for calculating a processing performance with respect to the constant bit rate connection type data and the available bit rate connection type data according to information related to the detected traffic of the constant bit rate connection type data and the available bit rate connection type data;

a traffic control portion for controlling data processing of the ATM switch according to values analyzed by the performance analyzing portion;

a data storing portion for storing values analyzed by the performance analyzing portion;

an inputting portion for inputting processing performance values desired for the constant bit rate connection type data and the available bit rate connection type data; and a performance determining portion for calculating a processing capacity of the ATM switch that satisfies parameters input from the inputting portion, by using the data stored in the data storing portion.

9. A method for analyzing a performance of an asynchronous transfer mode (ATM) switch installed in a communication network for processing a data circuit exchange, comprising the steps of:

(a) detecting traffic of constant bit rate connection type data and available bit rate connection type data input to the ATM switch;

(b) calculating a processing performance of the ATM switch with respect to the constant bit rate connection type data and the available bit rate connection type data according to information related to the detected traffic of the constant bit rate connection type data and the available bit rate connection type data; and calculating a processing capacity of the ATM switch based on the processing performance, wherein the processing capacity includes a processing capacity value C that is to be allotted to a constant bit rate connection.

10. The method of claim 9, wherein the information related to the detected traffic includes arrival rates per second of the constant bit rate connection type data and the available bit rate connection type data.

11. A method for analyzing a performance of an asynchronous transfer mode (ATM) switch installed in a communication network for processing a data circuit exchange, comprising the steps of:

(a) detecting traffic of constant bit rate connection type data and available bit rate connection type data input to the ATM switch; and (b) calculating a processing performance of the ATM switch with respect to the constant bit rate connection type data and the available bit rate connection type data according to information related to the detected traffic of the constant bit rate connection type data and the available bit rate connection type data;

wherein the information related to the detected traffic includes arrival rates per second of the constant bit rate connection type data and the available bit rate connection type data; and wherein the step (b) calculates a connection denial rate of the constant bit rate connection type data and an average delay time of the available bit rate connection type data from a value output from a traffic detecting portion, a selected average occupancy time of the constant bit rate connection type data in the ATM switch, and an average data size of the available bit rate connection type data to be transmitted.

* * * * *